United States Patent [19]
Yamada

[11] Patent Number: 5,457,547
[45] Date of Patent: Oct. 10, 1995

[54] ORIGINAL IMAGE READING APPARATUS

[75] Inventor: Masanori Yamada, Kawasaki, Japan

[73] Assignee: Canon Kabushiki Kaisha, Tokyo, Japan

[21] Appl. No.: 343,886

[22] Filed: Nov. 17, 1994

Related U.S. Application Data

[63] Continuation of Ser. No. 967,858, Oct. 28, 1992, abandoned.

[30] Foreign Application Priority Data

Oct. 31, 1991 [JP] Japan .................................. 3-286432

[51] Int. Cl.⁶ .................................................. H04N 1/04
[52] U.S. Cl. ........................... 358/487; 358/474; 358/494; 355/84
[58] Field of Search ............................... 358/461, 464, 358/444, 487, 497, 474, 494, 408, 75, 467, 496, 506, 493

[56] References Cited

U.S. PATENT DOCUMENTS

| | | | |
|---|---|---|---|
| 4,751,584 | 6/1988 | Midorikawa | 358/474 |
| 4,760,464 | 7/1988 | Sakano | 358/461 |
| 4,806,780 | 2/1989 | Yamamoto et al. | 358/461 |
| 4,893,196 | 1/1990 | Koshiyouji | 358/474 |
| 4,901,157 | 2/1990 | Ohmori | 358/474 |
| 4,922,335 | 5/1990 | Outa et al. | 358/506 |
| 4,972,226 | 11/1990 | Kawai | 358/300 |
| 4,989,099 | 1/1991 | Koshiyouji et al. | 358/474 |
| 5,014,123 | 5/1991 | Imoto | 358/506 |
| 5,016,096 | 5/1991 | Matsunawa et al. | 358/75 |
| 5,113,268 | 5/1992 | Yoshida et al. | 358/487 |

Primary Examiner—Edward L. Coles, Sr.
Assistant Examiner—Madeleine Nguyen
Attorney, Agent, or Firm—Fitzpatrick, Cella, Harper & Scinto

[57] ABSTRACT

An original image reading apparatus, capable of simultaneously reading a reflective original and a transmissive original, with optimum shading corrections for both, is disclosed. For this purpose there are provided a shading data RAM of a line and a shading correction look-up table for each of the reflective and transmissive originals, and these RAM's and look-up tables are suitably switched according to a selection signal indicating the kind of the original.

24 Claims, 12 Drawing Sheets

FIG. 12A
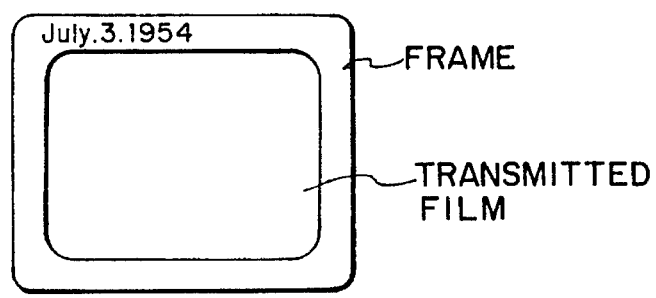
FIG. 12B
FIG. 12C
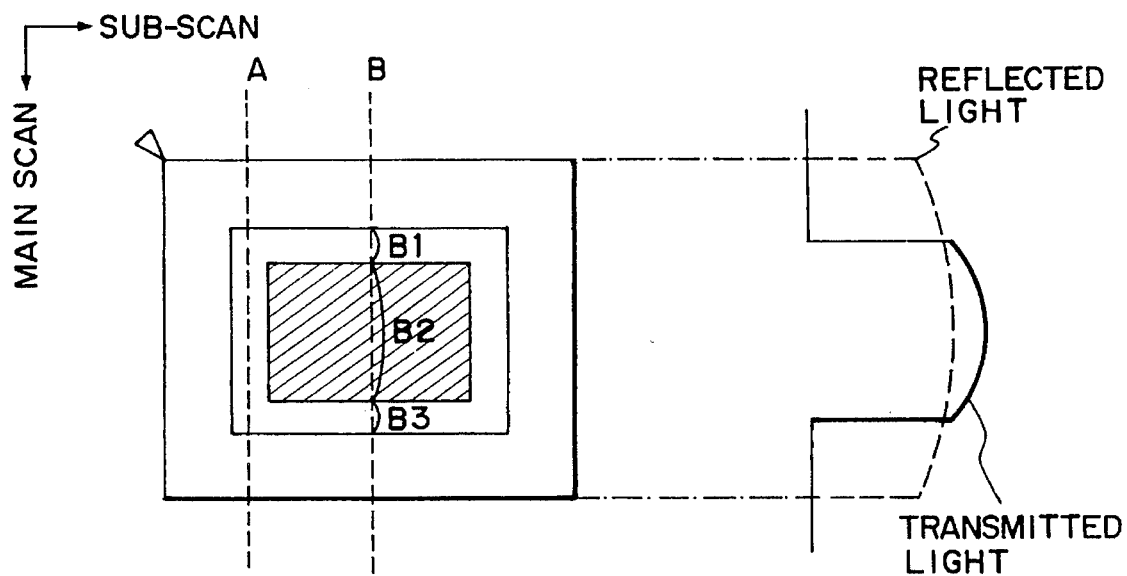

ORIGINAL IMAGE READING APPARATUS

This application is a continuation of application Ser. No. 07/967,858, filed Oct. 28, 1992, now abandoned.

BACKGROUND OF THE INVENTION

1. Field of the Invention

The present invention relates to an image reading apparatus for reading a reflective original and a transmissive original.

2. Related Background Art

The original image reading apparatus capable of reading both a reflective original and a transmissive original is disclosed for example in U.S. Pat. No. 4,989,099. However, this apparatus can only read a reflective original or a transmissive original at a time. More specifically, the apparatus is equipped with a light source for the reflective original and a light source for the transmissive original, and reads the reflective original by lighting the former light source or the transmissive original by lighting the latter.

Such reading apparatus is not capable of reading an original having both a reflective area and a transmissive area, or of simultaneously reading a reflective original and a transmissive original placed on the original supporting table.

Also it is already well known to effect, in case of reading a reflective image only, shading correction on the signal read from the original image, based on shading data obtained by reading a reference white board.

However, in case of reading an original containing a reflective area and a transmissive area therein, satisfactory image reading cannot be attained even if the conventional shading correction is conducted.

An example of such original containing a reflective area and a transmissive area is an OHP (overhead projector) film. Such OHP film original is usually stored in a framed state as shown in FIG. 12A, and it is required either to exactly read the image of the film area inside the frame or to read the image inclusive of the information written on the frame.

In case of simultaneously reading the film area and the frame area, the image reading has to be executed respectively by the transmitted light and the reflected light, but the states of shading for these two image areas are completely different as shown in FIG. 12B.

For example, at a sub-scanning position A in FIG. 12B, as the image is read by the reflected light, there is required shading correction for the reflected light. At a sub-scanning position B, there are required shading correction for the reflected light in the main scanning areas B1 and B3, and shading correction for the transmitted light in the main scanning area B2.

However, the conventional original reading apparatus has been unable to obtain a satisfactory image in this manner. The same applies to the case of simultaneously reading an image projected from a 35 mm film and a reflective original image.

SUMMARY OF THE INVENTION

In consideration of the foregoing, an object of the present invention is to provide an original reading apparatus enabling satisfactory reading of a framed OHP film or the like.

Another object of the present invention is to provide an original reading apparatus capable of providing a satisfactory read image in simultaneous reading of a projected image of a film and a reflective original.

Still another object of the present invention is to provide an original reading apparatus capable of applying optimum shading correction for the reflective and transmissive originals thereby providing satisfactory image signal.

The foregoing and still other objects of the present invention, and the advantages thereof, will become fully apparent from the following description.

BRIEF DESCRIPTION OF THE DRAWINGS

FIGS. 12A to 12C are views for explaining the reading operation for an OHP film.

DETAILED DESCRIPTION OF THE PREFERRED EMBODIMENTS

Now the present invention will be clarified in detail by preferred embodiments thereof shown in the attached drawings.

Figure 10:
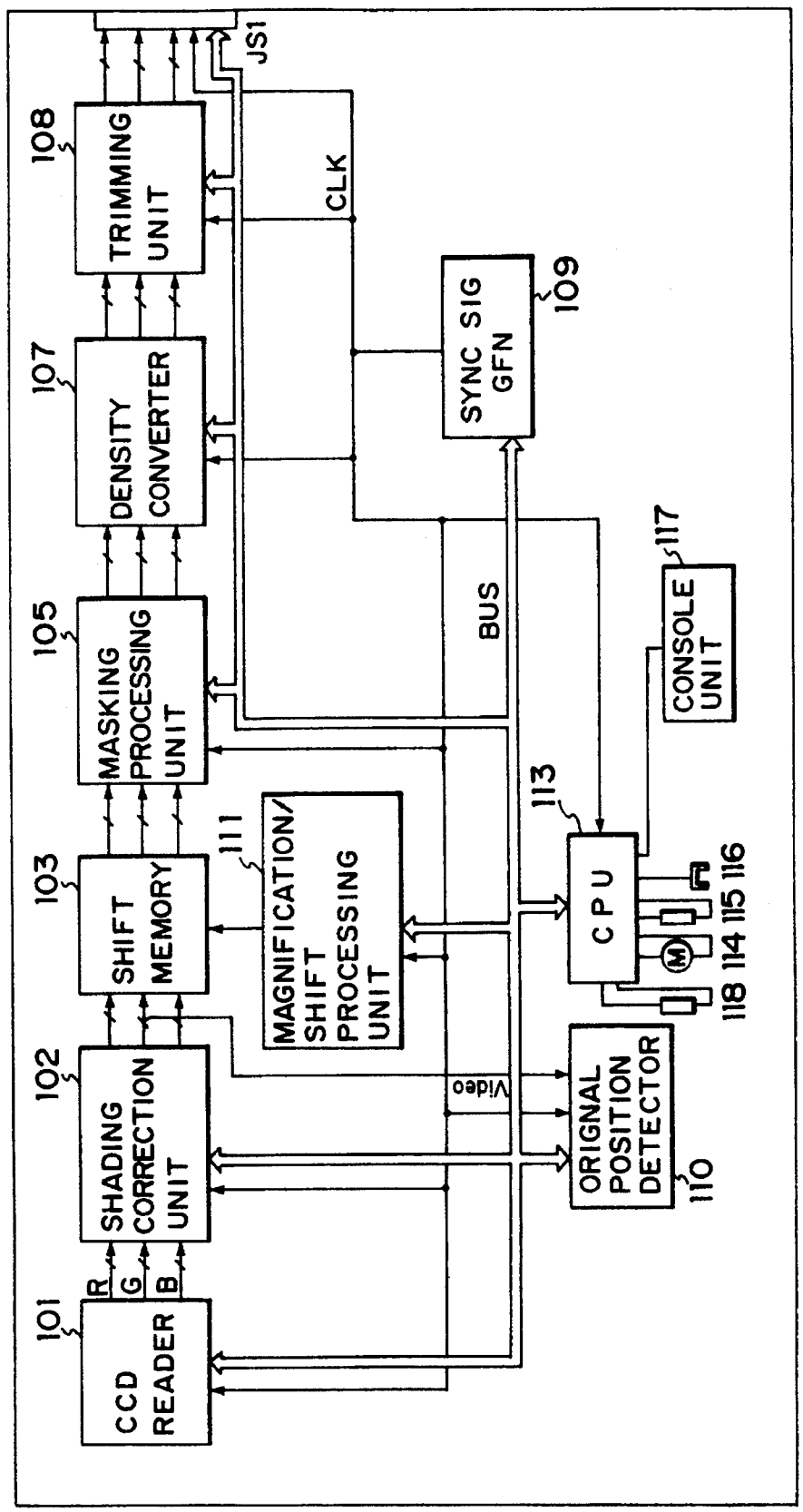
FIG. 10 is a block diagram showing the circuit configuration of a color image reading apparatus.
Figure 11:
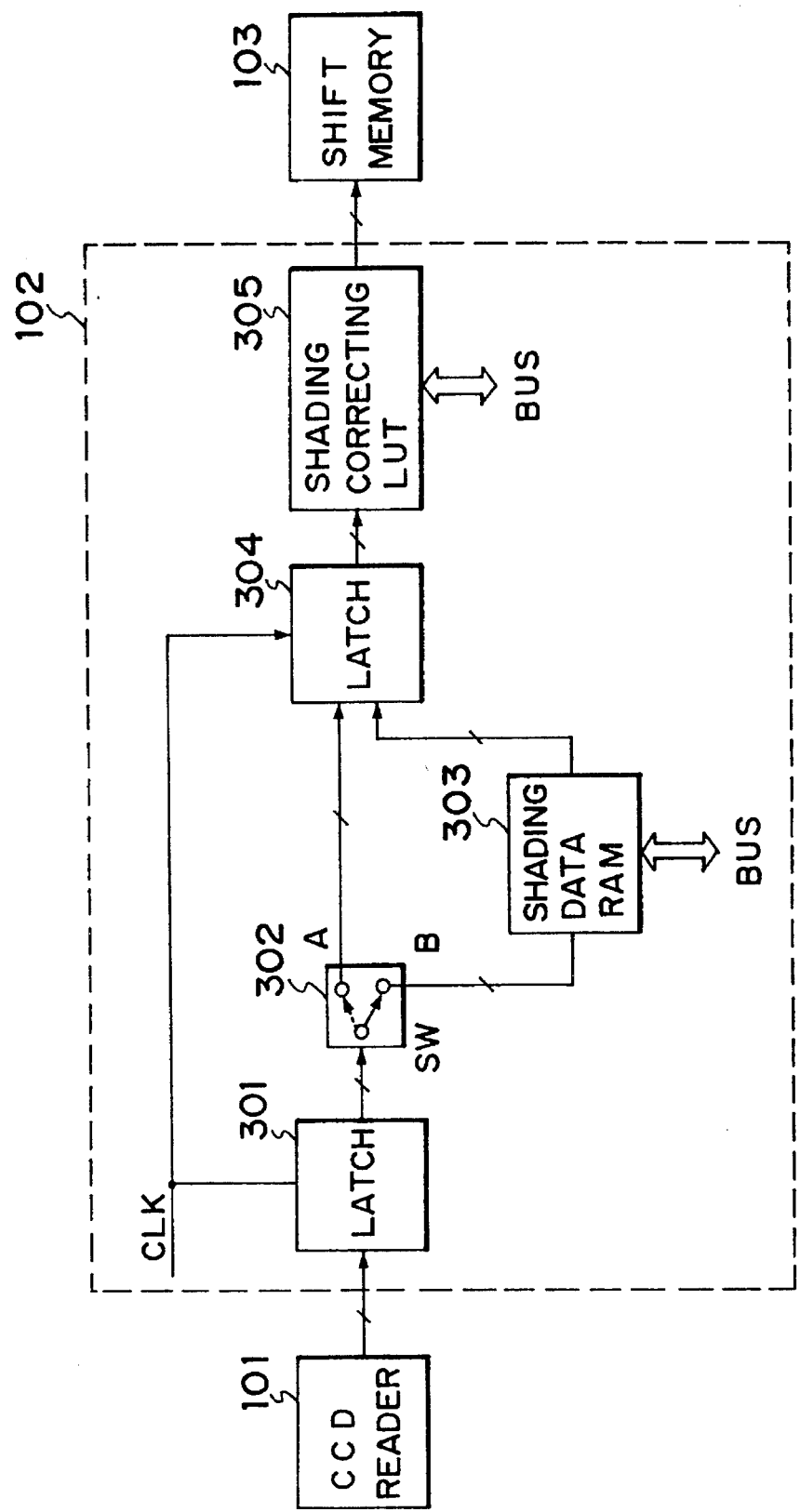
FIG. 11 is a block diagram of a shading correction circuit.

FIG. 10 is a block diagram of a color original reading apparatus of which configuration will be explained in the following. A CCD reader unit 101 is provided with a color sensor for obtaining independent analog color signals of R (red), G (green) and B (blue), amplifiers for amplifying respective color signals, and A/D converters for converting the amplified signals into 8-bit digital signals.

The signals are subjected to a shading correction in respective colors in a shading correction unit 102, corrections of the aberrations between the colors and between the pixels in a shift memory unit 103, a correction for the filter characteristics of the color sensors in a masking unit 105, then converted into desired densities in a density conversion unit 107, further trimmed into desired areas in a trimming unit 108, and released to the outside through a connector JS1.

A synchronization signal generation unit 109 generates a horizontal synchronization signal HSYNC and a pixel synchronization signal CLK for internal use, and sends these signals to various units and a CPU.

An original position detecting unit 110 detects the position and the size of the original, based on the G (green) signal after shading correction. Said detection can be achieved by a method disclosed in U.S. Pat. No. 5,282,064 issued Jan. 25, 1994.

A magnification/shift processing unit effects a magnification change and a shift of the image by controlling the timing of data write-in to and read-out from the shift memory.

A CPU 113 is provided, in addition to a microprocessor, with an I/O circuit, a timer circuit, an interruption control circuit, a serial communication circuit, a ROM, a RAM etc. in the already known manner, and controls the various units mentioned above. The CPU 113 also controls a stepping motor 114 for driving the optical system, a reflective original illuminating lamp 115, a transmissive original illuminating lamp 118, a home position sensor 116 and an operation unit 117.

Figure 1:
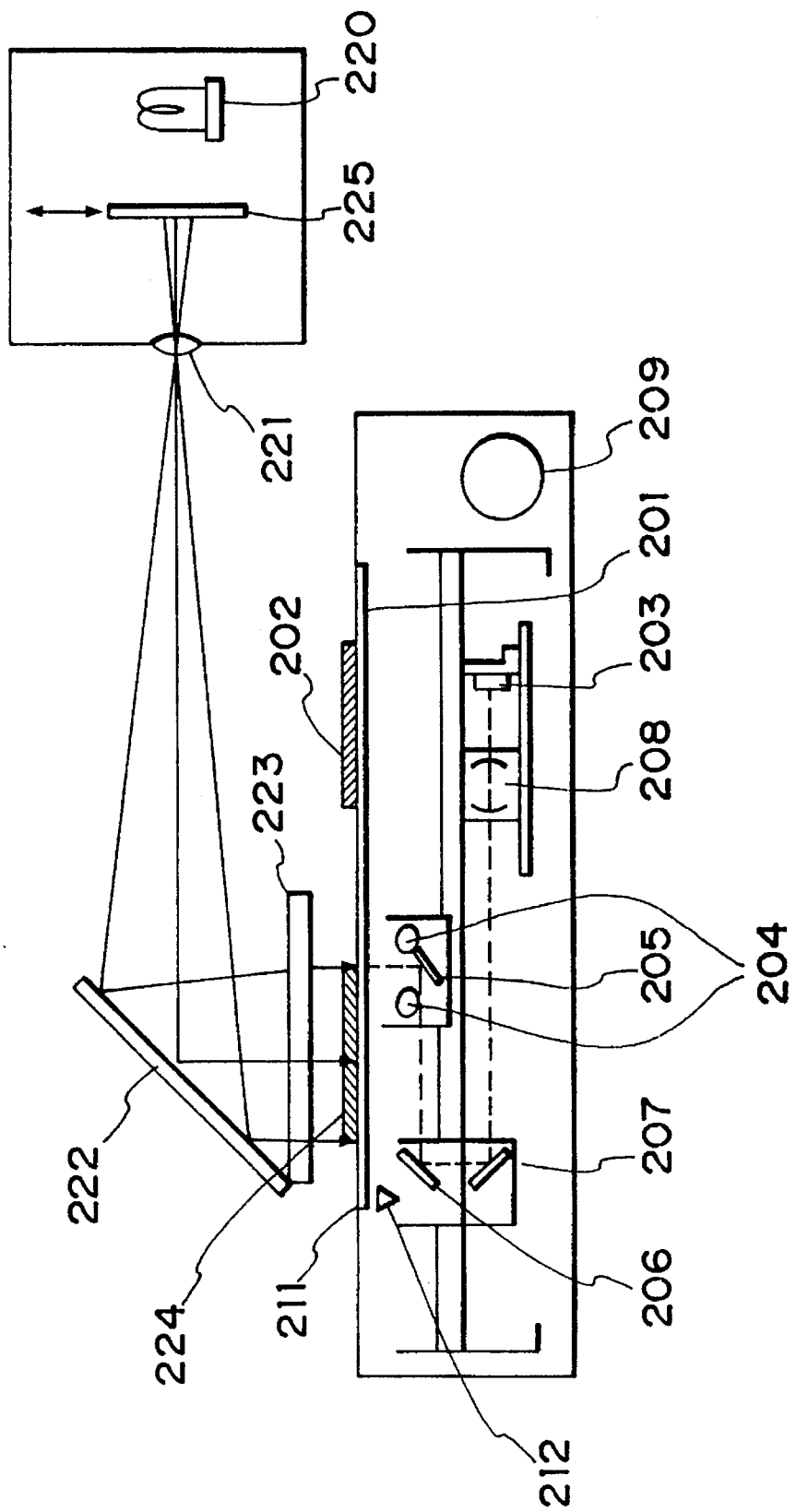
FIG. 1 is a view showing the configuration of a color image reading apparatus embodying the present invention.

FIG. 1 shows the configuration of a color original reading apparatus embodying the present invention.

In FIG. 1 there are shown an original table 201, a reflective original 202, a color image reading CCD 203 consisting of plural photosensor elements arranged in a linear array, a reflective original illuminating lamp 204, mirrors 205–207, an imaging lens 208, and a motor 209.

The original is sub-scanned by the movement of the lamp 204 and the mirrors 205–207 by means of the motor 209, whereby the original image is focused in succession on the CCD 203.

A standard white board 211 is provided for obtaining shading data for shading correction, and a position in which the lamp 204 and the mirrors 205–207 are so positioned that the lamp 204 illuminates said white board 211 and the reflected light therefrom is guided to the CCD 203, is called the optical home position. A sensor 212 is provided for detecting that an optical system consisting of the lamp 204 and the mirror 205 is in said home position.

The above-explained configuration enables the reading of a reflective original, but the following configuration is provided for reading a transmissive original.

Light coming from a transmissive original illuminating lamp 220 and transmitted by a transmissive original 225 such as a negative or reversal film of 35 mm format is magnified by a lens 221 and forms a projected image on a glass plate constituting the original table, via a mirror 222 and a Fresnel lens 223.

For reading said projected image, the sub-scanning operation of the mirrors 205–207 is conducted while the reflective original illuminating lamp 204 is turned off. There is also shown a transmissive original 224 such as a large-sized film or an OHP film, which is placed directly on said glass plate.

Figure 2:
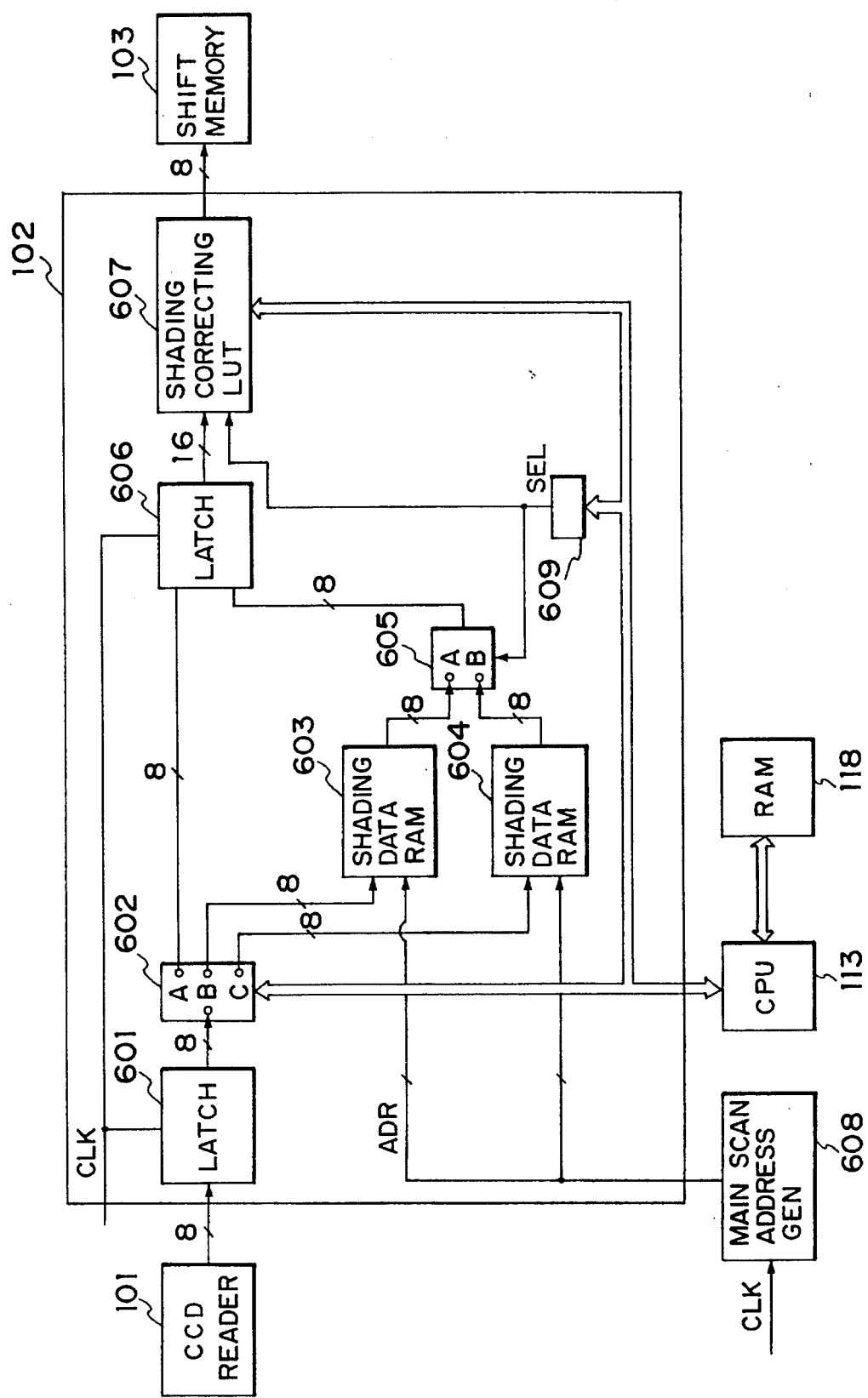
FIG. 2 is a block diagram of a shading correction circuit.

FIG. 2 is a block diagram of the shading correction unit employed in the original reading apparatus of the present invention. There is illustrated one of three systems provided for R, G and B in said shading correction unit.

Shading data RAM's 603, 604 are provided respectively for the reflective and transmissive originals.

Prior to the original scanning, a switch in a switch unit 602 is shifted to the side B, and the image obtained from the standard white board 211 is sampled through a latch 601, and is stored in the RAM 603.

Also the shading data of a transmissive original are stored through the latch 604 in the RAM 604, without the setting of the original if it is an OHP film or a reversal film of 35 mm format, or, with the setting of an unimaged base film in case it is a negative film of 35 mm format. In this operation, the switch of the switch unit 602 is placed at the side C. This switching operation is controlled by the CPU 113.

At the original scanning, the side A is selected in the switching unit 602, and the read image signal is supplied, through a latch 606, to a shading correction look-up table (LUT) 607, as addresses therefor.

On the other hand, the content of either of the RAM's 603, 604 is selected by a switch unit 605, and supplied to the shading correction LUT 607, as addresses therefor.

A selection signal generation unit 609 generates a selection signal SEL for the switch unit 605, according to an instruction of the CPU 113.

The shading correction LUT receives, in addition to the read image signal and the shading data, said selection signal SEL, for controlling the selection of a correction data memory space for the reflective original and another correction data memory space for the transmissive original.

At the original scanning, the addresses ADR for the shading data RAM's 603, 604 are given by a main scanning address generation circuit 608.

Figure 3:
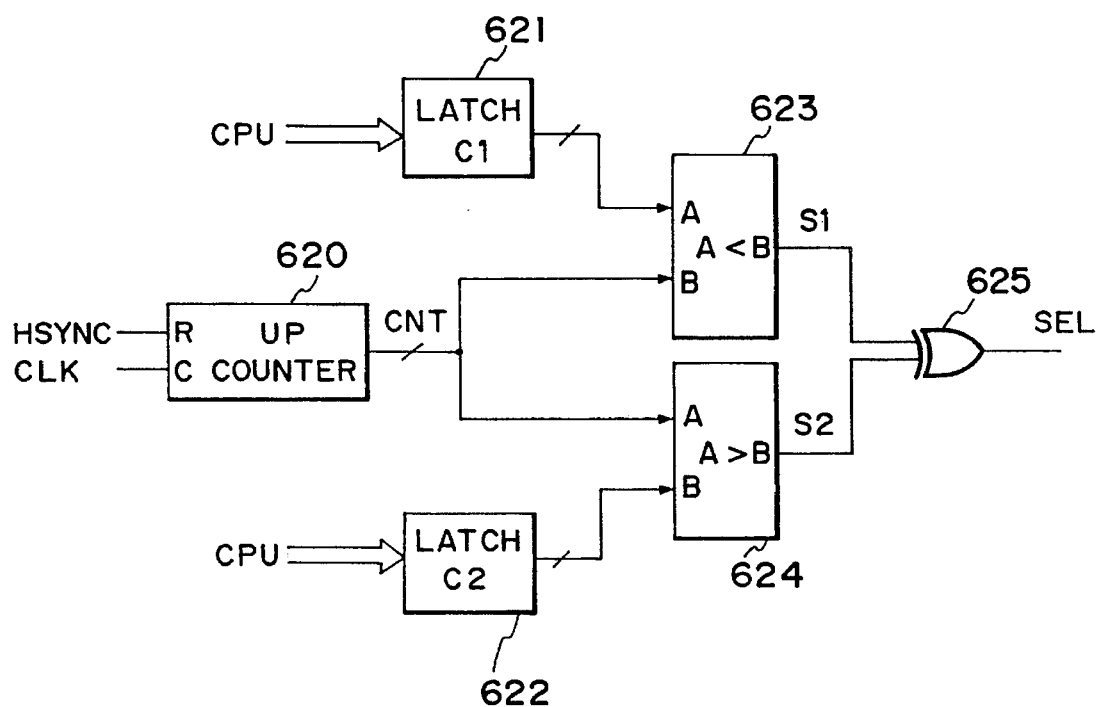
FIG. 3 is a block diagram of a selection signal generating circuit.

FIG. 3 is a block diagram of the selection signal generation unit 609.

An up-counter 620 is reset to "0" by the horizontal synchronization signal HSYNC, and counts the pixel clock signals CLK. Latches 621, 622 are provided for storing arbitrary comparison values supplied from the CPU 113 through a CPU bus. Comparators 623, 624 compare the count of the counter 620 with the values stored in advance in the latches 621, 622 by the CPU 113 and release comparison signals S1, S2, from which the selection signal SEL is formed by an exclusive OR gate 625.

Figure 4:
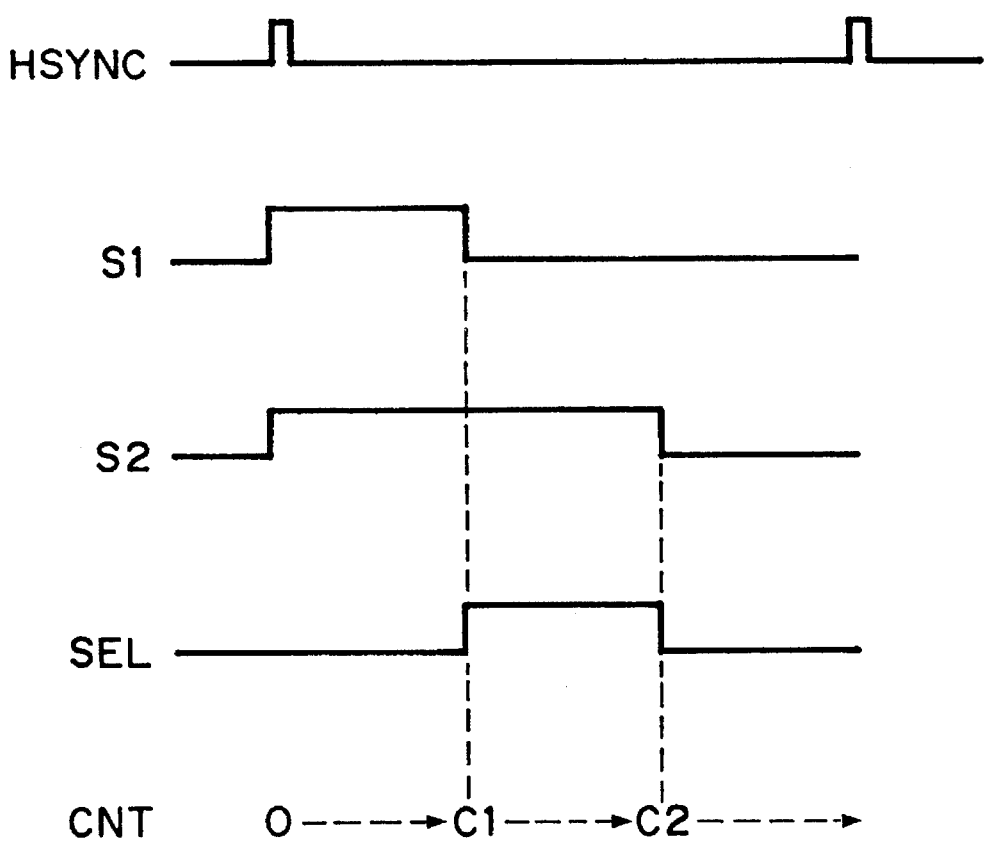
FIG. 4 is a timing chart of the selection signal generating circuit.

As in an example shown in FIG. 4, with the comparison values C1, C2 satisfying a condition 0<C1<C2, the signal SEL assumes a value "1" in a section between C1 and C2, and a value "0" in other sections.

Figure 5:
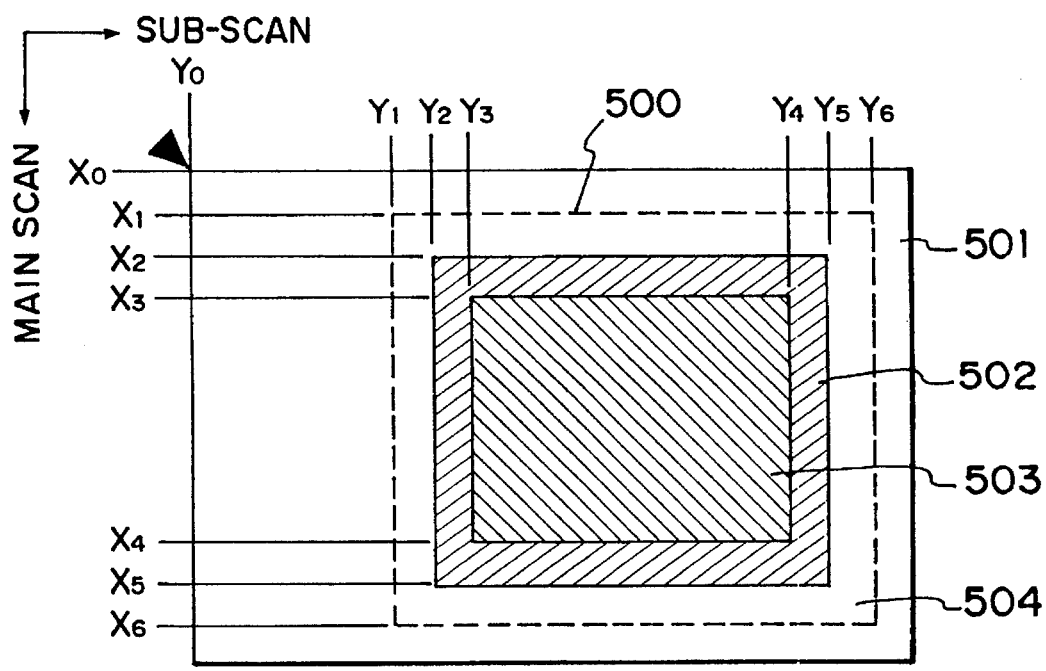
FIG. 5 is a view of an OHP film.
Figure 6:
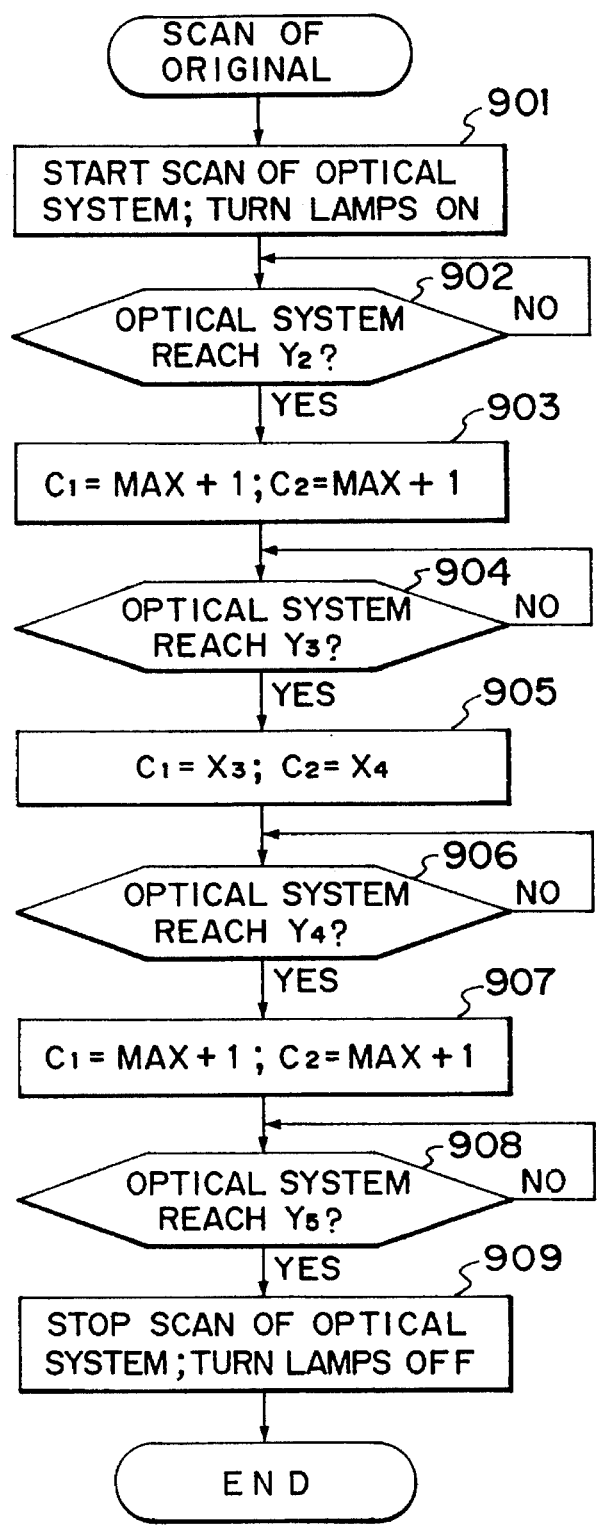
FIG. 6 is a flow chart showing the control sequence.

FIG. 6 shows the control sequence in case of reading an OHP film original 500 placed on the original supporting table 501 as shown in FIG. 5.

Referring to FIG. 5, an area defined by the coordinates X1, X6, Y1 and Y6 receives the transmitted light from the Fresnel lens 504, while an area defined by the coordinates X3, X4, Y3 and Y4 has the original image of an OHP film 503 to be read as a transmissive image, and a frame area defined by the coordinates X2, X5, Y2 and Y5 but present outside the above-mentioned area is to be read as a reflective image.

Said coordinates X1–X6, Y1–Y6 are detected by the original position detection unit 110 at the collection of the shading data of the reflective and transmissive originals, and are stored in advance in the RAM 118 which is used as the working area of the CPU 113.

Said coordinates X1–X6, Y1–Y6 may also be entered by the operator from the operation unit 117.

The method of detection of said coordinates X1–X6, Y1–Y6 is described in the aforementioned U.S. patent application Ser. No. 575,878.

The flow shown in FIG. 6 is to be started in a state after the setting of the shading data in the RAM's 603, 604 and of the data in the correction LUT 607.

The original illuminating lamps 204, 220 are turned on, and the scanning motion of the optical system is started (step 901). When the optical system reaches the sub-scanning coordinate Y2 (step 902), a value larger than the one-line count MAX, for example "MAX+1" is set as the value C1 for the latch 621 and as the value C2 for the latch 622 (step 903).

Since the count of the up-counter 620 is always smaller than "MAX+1", the signal SEL remains as "0" during a line, so that the shading correction for the reflective original is conducted. When the optical system reaches Y3 (step 904), X3 and X4 are set respectively as the values C1 and C2 (step 905).

In this manner the signal SEL assumes a value "1" in a main scanning section between X3 and X4, whereby the shading correction for the transmissive original is executed, and, the signal SEL assumes a value "0" in sections between X2 and X3, and between X4 and X5, whereby the shading correction for the reflective original is executed.

When the optical system reaches Y4 (step 906), "MAX+1" is again set as C1 and C2 (step 907). Then, when the optical system reaches Y5 (step 908), the scanning motion is terminated and the two lamps are turned off (step 909), whereby the scanning for original reading is terminated.

As explained in the foregoing, optimum shading corrections for the reflective and transmissive originals can be attained in a single original scanning operation, by providing a shading data RAM and a correction LUT for each of the reflective and transmissive originals, and by switching these according to a selection signal which is controlled corresponding to the areas of the reflective and transmissive originals.

In the foregoing first embodiment, there are provided two lines of shading data RAM's 603, 604 and the shading correction is achieved by a look-up table. In contrast, the present second embodiment employs a multiplier and a single line of the shading data RAM.

Figure 7:
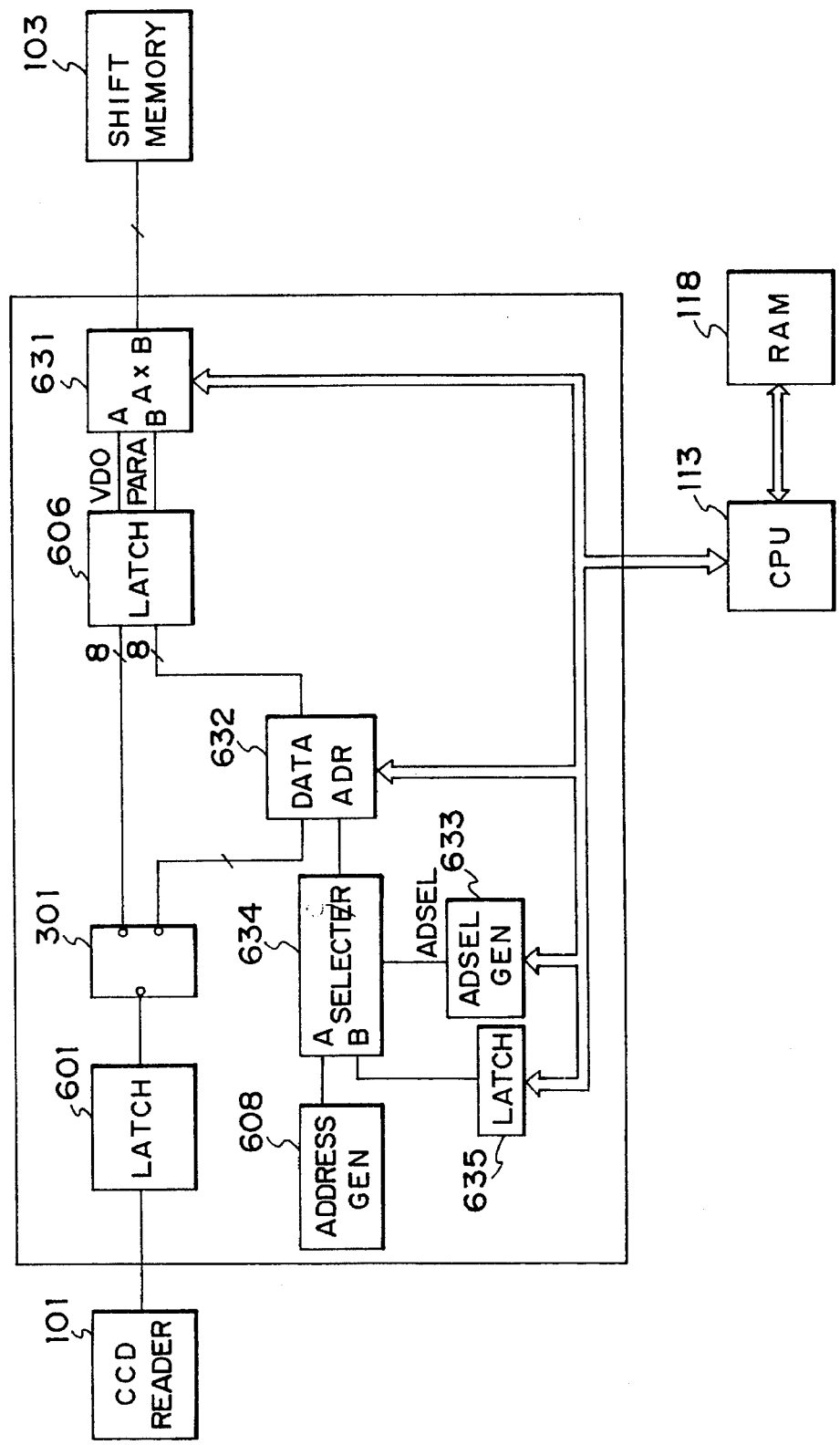
FIG. 7 is a block diagram of a shading correction circuit.

FIG. 7 is a block diagram of the shading correction circuit in the second embodiment. In the following description, components equivalent to those in the first embodiment or in the prior art are omitted.

A shading correction coefficient table 632 stores multiplication coefficients for correction, corresponding to all the pixels in the main scanning. A multiplier 631 effects multiplication, at the original scanning, of 8-bit read image data VDO and 8-bit shading correction coefficient PARA and sends upper 8 bits of the result of said multiplication to the shift memory 103.

An ADSEL signal generation unit 633 controls the address in feeding the shading data to the shading correction coefficient table.

A selector 634 switches the address generated by an address generation unit 608 and the address set in a latch 635 by the CPU 113, according to said ADSEL signal.

In case the number of the pixels of the CCD is for example 5,000, an address outside the effective main scanning area, such as "5001" is set in the latch 635, whereby the image data sampled when the ADSEL signal is "0" is written in the address 5001 and can be discarded as an ineffective data. The ADSEL signal generation unit 633 can be realized by a structure similar to that of the selection signal generation unit 609 of the first embodiment shown in FIG. 3, and will not, therefore, be explained in detail.

Figure 8A:
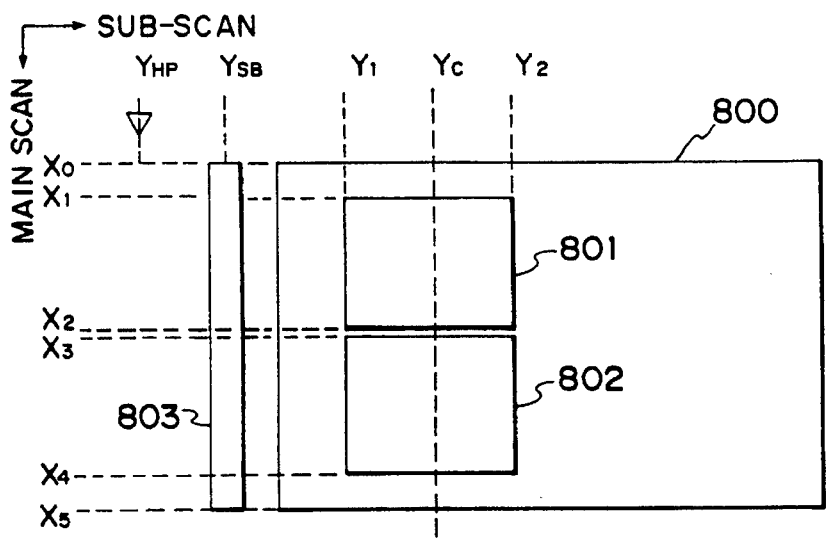
FIGS. 8A to 8C are views for explaining the image reading operation.

As shown in FIG. 8A, there will be considered a case of simultaneously reading a transmissive original 801 and a reflective original 802 present along the main scanning direction on an original table 800, wherein YHP is the coordinate of the home position in the sub-scanning direction, and YSB is the sub-scanning coordinate corresponding to the standard white board.

Figure 8B:
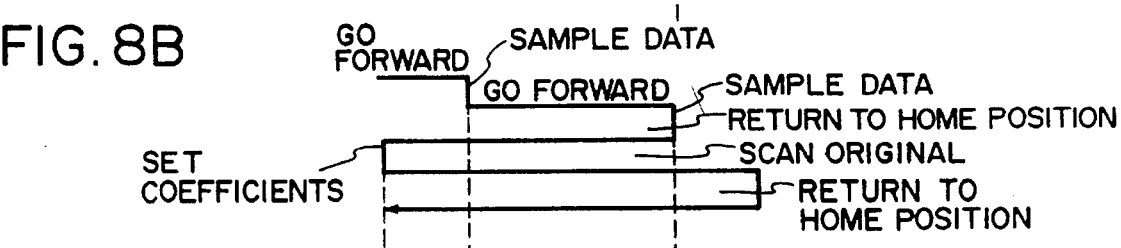
Figure 8C:
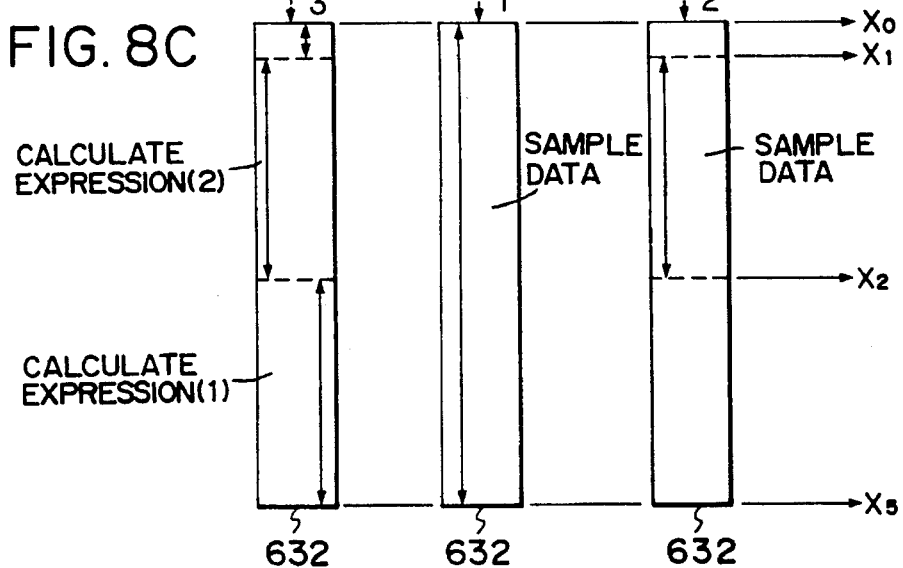
Figure 9:
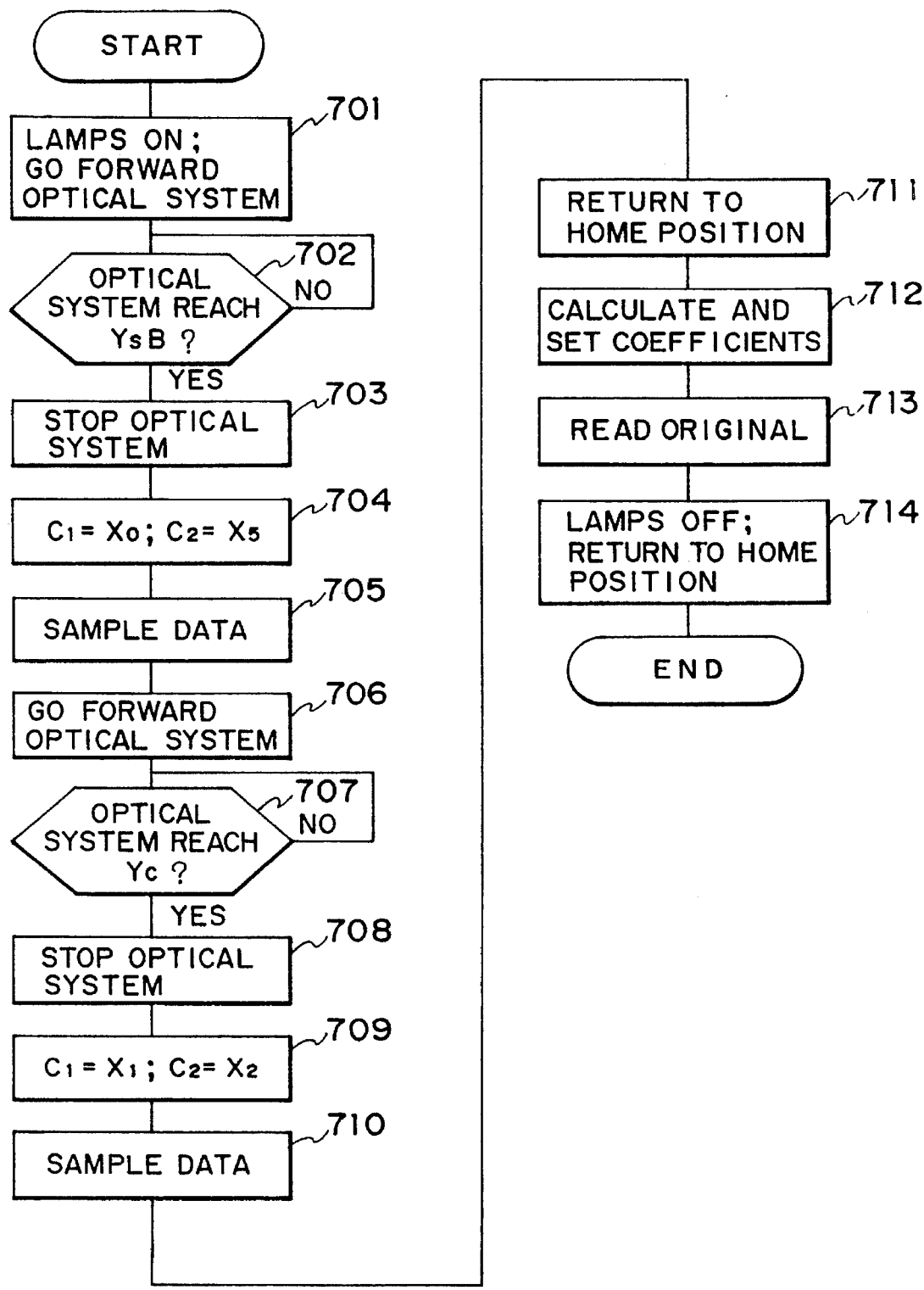
FIG. 9 is a flow chart showing the control sequence.

FIG. 8B shows the mode of reading operation, while FIG. 8C shows the states of the table 632, and the control sequence will be explained with reference to a flow chart shown in FIG. 9.

The optical system starts from YHP, with the lamp turned on (step 701). Upon reaching YSB (step 702), the optical system stops temporarily (step 703). Then, after X0, X5 are respectively set as the comparison values C1, C2 of the ADSEL signal generation unit (FIG. 3) (step 704), and the image data from the standard white board 803 are sampled in the table 632 (step 705). Thus the shading data for the reflective original 802 are sampled over the entire area from the address X0 to X5 of the table 632 (FIG. 8C ①).

Thereafter the optical system starts to move again (step 706), and, upon reaching Yc (step 707), it is stopped (step 708). Then X1, X2 are set as the aforementioned comparison values C1, C2 (step 709), and the shading data for the transmissive original 801 are sampled (step 710). As a result, the data of the table 632 are overwritten from the address X1 to X2, while the data for the reflective original remain from X0 to X1 and from X2 to X5 (FIG. 8C ②).

After the data sampling, the optical system returns to the home position YHP (step 711), and the correction coefficients are calculated and set according to the shading data sampled in the table 632 (step 712). The coefficients for the reflective original and those for the transmissive original are respectively calculated by the equations (1) and (2) (FIG. 8C ③), as will be explained later.

After the setting of the coefficients, the originals are set, and the original reading is conducted to the sub-scanning position Y2 (step 713). Thereafter the lamp is turned off, and the optical system is returned to the home position to terminate the sequence (step 714).

The calculation of the correction coefficients is conducted in the following manner.

The correction coefficient KHi is determined by the equation:

$$KHi=TH \cdot RH/SHi \qquad (1)$$

wherein RH is the ratio of the data of the standard white board to the white data on the original table, namely (standard white board data)/(white data on the original support table); SHi is the sample value of the shading data from the standard white board 803, in which i stands for the main scanning address from 0 to 4,999; and TH is the target value of the white data on the original support table 800.

On the other hand, the correction coefficient KTi for the transmissive original 801 is given by:

$$KTi=TT/STi \qquad (2)$$

wherein STi is the sampled value of the shading data in a state without the original (or with a unimaged base film of the negative film); and TT is the white target value of the transmissive original 801.

As explained above, the optimum shading correction is rendered possible also in case of simultaneously reading a reflective original 802 and a transmissive original 801, by using the shading data RAM of a line in divided manner for the reflective and transmissive originals.

As detailedly explained in the foregoing, optimum shading correction can be provided for the reflective original and the transmissive-original simultaneously present on the original supporting table, by providing a shading data RAM of a line and a shading correction LUT space for each of the reflective and transmissive originals and switching said RAM's and LUT's according to a selection signal corresponding to the original areas.

Also optimum shading correction can be provided for the reflective and transmissive originals simultaneously present in the main scanning area, by employing a configuration including a shading data RAM of a line and a multiplier and controlling the write-in addresses of said RAM corresponding to the areas of said reflective and transmissive original areas, at the sampling of the shading data.

Though the present invention has been explained by certain preferred embodiments thereof, the present invention is not limited by such embodiments and is subject to various modifications within the scope and spirit of the appended claims.

What is claimed is:

1. An original reading apparatus comprising:

an original support on which an original having a reflecting portion and a light transmissive portion is placed;

reading means for optoelectrically performing an original-reading operation to output an image signal by reading a light image reflected from the reflecting and light transmissive portions of the original;

first correction means for subjecting the image signal output from said reading means to first shading correction for the reflecting portion of the original;

second correction means for subjecting the image signal output from said reading means to second shading correction for the light transmissive portion of the original; and switching means for switching between said first and second correction means, in accordance with area data representing positions of the reflecting portion and the light transmissive portion of the original.

2. An apparatus according to claim 1, wherein said first and second correction means respectively include memory means for storing shading correction data for either the reflecting portion or the light transmissive portion.

3. An apparatus according to claim 2, wherein said switching means selects one of the shading correction data for the reflecting portion and the shading correction data for the light transmissive portion.

4. An apparatus according to claim 2, further comprising writing means for writing the shading correction data for the reflecting portion and the shading correction data for the light transmissive portion into said memory means provided in each of said first and said second correction means.

5. An apparatus according to claim 1, further comprising detecting means for detecting the positions of the reflecting portion and the light transmissive portion.

6. An apparatus according to claim 1, further comprising first light source means for exposing the reflecting portion and second light source means for exposing the light transmissive portion.

7. An original reading apparatus comprising:

an original support on which a reflecting original and a light transmissive original are placed together;

reading means for optoelectrically performing an original-reading operation to output an image signal by reading a light image from the reflecting original and the light transmissive original which are placed together on said original support;

first correction means for subjecting the image signal output from said reading means to first shading correction for the reflecting original;

second correction means for subjecting the image signal output from said reading means to second shading correction for the light transmissive original; and switching means for switching between said first and second correction means, according to area data representing positions of the reflecting original and the light transmissive original on said original support.

8. An apparatus according to claim 7, wherein said first and second correction means respectively include memory means for storing shading correction data for either the reflecting original or the light transmissive original.

9. An apparatus according to claim 8, wherein said switching means selects one of the shading correction data for the reflecting original and the shading correction data for the light transmissive original.

10. An apparatus according to claim 8, further comprising writing means for writing the shading correction data for the reflecting original and the shading correction data for the light transmissive original into said memory means provided in each of said first and second correction means.

11. An apparatus according to claim 7, further comprising detecting means for detecting the positions of the reflecting original and the light transmissive original.

12. An apparatus according to claim 7, further comprising first light source means for exposing the reflecting original and second light source means for exposing the light transmissive original.

13. An image reading apparatus comprising:

reading means for optoelectrically performing an original-reading operation by reading a light image from an original to output an image signal;

leading means for leading a light image reflected from a reflecting original together with a light image passing through a light transmissive original to said reading means;

first correction means for subjecting the image signal output from said reading means to first shading correction for the reflecting original;

second correction means for subjecting the image signal output from said reading means to second shading correction for the light transmissive original; and switching means for switching between said first and second correction means, in accordance with area data representing positions of the reflecting original and the light transmissive original.

14. An apparatus according to claim 13, wherein said first and second correction means respectively include memory means for storing shading correction data for either the reflecting original or the light transmissive original.

15. An apparatus according to claim 14, wherein said switching means selects one of the shading correction data for the reflecting original and the shading correction data for the light transmissive original.

16. An apparatus according to claim 14, further comprising writing means for writing the shading correction data for the reflecting original and the shading correction data for the light transmissive original into said memory means provided in each of said first and second correction means.

17. An apparatus according to claim 13, further comprising detecting means for detecting the positions of the reflecting original and the light transmissive original.

18. An apparatus according to claim 13, further comprising first light source means for exposing the reflecting original and second light source means for exposing the light transmissive original.

19. An apparatus according to claim 13, further comprising an original support on which an original is placed.

20. An apparatus according to claim 19, wherein the reflecting original and the light transmissive original are placed on said original support.

21. An apparatus according to claim 19, further comprising projecting means for projecting the light image passing through the light transmissive original onto said original support.

22. An image reading method comprising the steps of:

leading a light image passing reflected from a reflecting original together with a light image passing through a light transmissive original to a reading portion;

performing an original-reading operation by reading the light image led to the reading portion to output an image signal; and subjecting the output image signal to one of a first shading correction for the reflecting original and a second shading correction for the light transmissive original, in accordance with area data representing positions of the reflecting original and the light transmissive original.

23. A method according to claim 22, wherein, in said subjecting step, one of the first shading correction and the second shading correction is selected, according to the reading of the reflecting original and the light transmissive original.

24. A method according to claim 22, wherein, in said subjecting step, the first shading correction and the second shading correction are performed in accordance with a first shading correction data for the reflecting original and a second shading correction data for the light transmissive original, respectively.

* * * * *

UNITED STATES PATENT AND TRADEMARK OFFICE
CERTIFICATE OF CORRECTION

PATENT NO. : 5,457,547
DATED : October 10, 1995
INVENTOR(S) : MASANORI YAMADA

It is certified that error appears in the above-indentified patent and that said Letters Patent is hereby corrected as shown below:

IN THE DRAWINGS

Sheet 7 of 12: "SELECTER" should read --SELECTOR--.
Sheet 10 of 12: "ORIGNAL" should read --ORIGINAL--.

COLUMN 4

Line 49, "patent" should read --Pat. No. 5,282,064.--.
Line 50 should be deleted.

COLUMN 6

Line 55, "transmissive-original" should read
--transmissive original--.

Signed and Sealed this

Thirtieth Day of April, 1996

Attest:

BRUCE LEHMAN

Attesting Officer    Commissioner of Patents and Trademarks